United States Patent [19]

Steck et al.

[11] 4,272,563
[45] Jun. 9, 1981

[54] MANUFACTURE OF MAGNETIC RECORDING MEDIA HAVING A WEAR-RESISTANT SURFACE

[75] Inventors: Werner Steck, Mutterstadt; Werner Loeser, Ludwigshafen; Manfred Steuerwald, Frankenthal; Gerd Wunsch, Speyer; Paul Deigner, Weisenheim, all of Fed. Rep. of Germany

[73] Assignee: BASF Aktiengesellschaft, Fed. Rep. of Germany

[21] Appl. No.: 765,159

[22] Filed: Feb. 3, 1977

[30] Foreign Application Priority Data

Feb. 27, 1976 [DE] Fed. Rep. of Germany ....... 2608022

[51] Int. Cl.$^3$ .............................................. B05D 5/12
[52] U.S. Cl. .................................... 427/130; 427/131
[58] Field of Search .............................. 427/127–130; 1/48

[56] References Cited

U.S. PATENT DOCUMENTS 3,922,389  11/1975  Toledo et al. .................. 427/132 X

FOREIGN PATENT DOCUMENTS 1965482  7/1970  Fed. Rep. of Germany .
2135899  2/1972  Fed. Rep. of Germany .
2250460  4/1974  Fed. Rep. of Germany .

Primary Examiner—Bernard D. Pianalto
Attorney, Agent, or Firm—Keil & Witherspoon

[57] ABSTRACT

A process for the manufacture of wear-resistant magnetic recording media comprising a dimensionally stable base, a thin ferromagnetic metal layer, containing cobalt and/or nickel, firmly bonded thereto and a thin protective layer applied thereon. The protective layer is produced by treating the recording medium in a liquid basic medium, containing gaseous oxygen, for from 1 to 60 minutes at from 5° to 70° C., washing and drying the treated recording medium and then heating it in air at from 170° to 300° C. This method offers a particularly simple way of providing the ferromagnetic layer of the recording medium with a thin but uniform, mechanically stable and wear-resistant protective layer.

4 Claims, No Drawings

MANUFACTURE OF MAGNETIC RECORDING MEDIA HAVING A WEAR-RESISTANT SURFACE

The present invention relates to a process for the manufacture of wear-resistant magnetic recording media comprising a dimensionally stable base, a thin layer of ferromagnetic metal firmly bonded thereto, and a thin protective layer applied thereon.

Magnetic recording media which comprise a thin layer of ferromagnetic metal on a dimensionally stable base, e.g. a non-magnetic metal disk, have been known for a considerable time. Such recording media can be used in various magnetic recording systems and are of particular interest in electronic data recording. One of the problems in using magnetic metal layer memories is, however, their sensitivity to corrosion and to mechanical damage.

It has therefore already been proposed to protect the thin layer of ferromagnetic metal against corrosion and damage by applying a protective layer. Thus, German Pat. No. 1,297,427 discloses the protection of surfaces of thin layers of cobalt-containing ferromagnetic metal by producing a continuous protective layer consisting of $Co_3O_4$. According to U.S. Pat. No. 3,353,166 and German Laid-Open Application DOS No. 2,250,460 an oxide layer is produced in a similar manner on the surface of the metallic magnetic layer and is stabilized by a subsequent heat treatment at from 300° C. to 480° C. It is true that the magnetic recording media protected by this method exhibit a longer life than untreated magnetic recording media of the same type, but they do not meet the high standards of use performance demanded of the magnetic disks. In particular, if the magnetic head is in sustained contact with the magnetic layer, local scratches become visible after some time and rapidly spread over the entire recording surface. German Published Application DAS No. 1,282,084 further discloses improving the resistance of surfaces of thin layers of ferromagnetic metal to abrasion and other damage by applying to the layers a thin layer of natural or synthetic waxes. However, since the adhesion of waxes to metal layers is poor, an intermediate layer of a polymer is first applied to the metal layer; this intermediate layer on the one hand adheres well to the metal layer and on the other hand is intended to act as an adsorbent base for the wax lubricant layer. It has also been disclosed to combine the oxidation of the metallic surface, by means of aqueous solutions of oxidizing acids, with a heat treatment of the resulting oxide layer and the application of materials which form a lubricant film (German Published Application DAS No. 1,965,482 and German Laid-Open Application DOS No. 2,135,899). Whilst the resulting magnetic recording media exhibit improved lubricity; they do not have the resistance required to withstand, without mechanical damage, repeated landing of the flying magnetic heads and repeated contact with the edges of the head at the conventional speeds of rotation of the disks, i.e. at from 1,500 to 3,600 rpm. Instead, local damage of the thin metal layer results after some time and in most cases acts as the starting point of the complete destruction of the magnetic recording medium. The coating of magnetic recording media, carrying thin layers of magnetic metal, with a thin layer of rhodium has also been disclosed, but these magnetic recording media still exhibit unsatisfactory resistance to mechanical damage. Finally, U.S. Pat. No. 3,498,837 discloses coating recording media, possessing thin layers of ferromagnetic metal, with a vapordeposited chromium/chromium oxide layer in a high vacuum. However, the process is expensive and frequently fails to produce satisfactory results.

It is an object of the present invention to provide a process for the manufacture of magnetic recording media possessing a ferromagnetic metal layer provided with a thin but uniform, mechanically stable and wear-resistant protective layer, by which process the protective layer can be produced particularly simply, though it exhibits excellent wear resistance. It is a further object to provide a process whereby the protective layer can be produced at temperatures as low as possible, to avoid damage or modification of the recording medium.

We have found that these objects are achieved and that magnetic recording media comprising a base which is resistant to temperatures of up to 300° C., and a thin layer of a cobalt-containing and/or nickel-containing ferromagnetic metal, firmly bonded to the base, can be provided particularly simply with a uniform, wear-resistant surface-protection layer by a process wherein the recording medium is treated in a liquid basic medium, containing gaseous oxygen, for from 1 to 60 minutes at from 5° to 70° C. and the treated recording medium is washed, dried and then heated in air at from 170° to 300° C.

In a preferred embodiment, the basic liquid medium comprises an aqueous solution having a pH of from 9 to 13.2, especially from 9.5 to 13.0.

To obtain the desired pH, basic substances are dissolved in water or in an organic solvent; these bases must be sufficiently soluble, especially in the organic solvents.

Examples of very suitable substances for use in aqueous solutions are alkali metal hydroxides, alkali metal carbonates and tertiary phosphates such as $Na_3PO_4$ or $K_3PO_4$. Ammonia is also very suitable. When using organic solutions, for example comprising alcohols, such as methanol, ethanol or isopropanol, as solvents, examples of very suitable substances are ammonia or alkali metal hydroxides. Mixtures of either the solvents or the basic compounds may also be used. The solutions produced as described above may at times act as buffer solution. Examples are mixtures of NaOH and $NaHCO_3$ and of NaOH and $Na_3PO_4$. The conventional buffer solutions, usually borate buffers and phosphate buffers, may be employed. In some cases, especially at a basic pH, the additional use of conventional complex-forming agents may be advantageous, in order to avoid precipitation of hydroxides or basic salts. Suitable complex-forming agents are the compounds conventionally used in chemical or electrolytic metal deposition, e.g. citrates, tartrates and the like. Such buffer systems are to be found, for example, in the Handbook of Chemistry and Physics, 55th Edition, 1974–75, CRC-Press, pages D 112–114.

According to the present invention, surprisingly, the mere presence of oxygen in the solution suffices to produce in a simple manner, in the basic medium, a primary uniform thin oxidic film which can, in a further step, be converted to a wear-resistant surface, the protective layer having a uniform thickness and exhibiting very good adhesion. The excellent uniformity of the protective layer can readily be established by electromicrographs of ultra-thin sections.

The treatment of the metallic magnetic recording layer in the basic medium is carried out at from 5° to 70° C., preferably from 10° to 45° C., for a period of from 1 to 60 minutes, preferably of up to about 30 minutes. At a high concentration of the base and/or at elevated temperatures of the alkaline solution, shorter durations of treatment are advisable since undesirable etching of the surface of the layer may otherwise occur in certain circumstances. On the other hand, lowering the basicity requires a lengthening of the period of treatment, but this makes simple and economical operation more difficult.

The combination of surface treatments in a basic medium, and subsequent heat treatment of the metallic magnetic layers, carried out in accordance with the invention, results in protective layers of uniform thickness and high resistance to wear, which cannot be obtained by the heat treatment alone; instead, the heat treatment alone merely results in non-uniform oxidation of the metal surface. Under these conditions, differences in coloration are observed even over fairly small areas, and these are attributable to non-uniform formation of the protective layer. However, to achieve uniformity of oxidation in the process according to the invention it is not absolutely essential that the surface of the layer should exhibit a visually detectable primary oxide layer. Even if the primary oxidic layer produced in solution is visually not yet detectable, the heat treatment results in a uniform protective layer. The visually recognizable discoloration of the layer surface, which is, for example, readily observable in transparent reaction vessels made of glass or plastics, however provides a good indicator of satisfactory formation of the primary layer.

After the treatment of the layer of magnetic metal in the basic medium, the recording medium is washed with water and /or organic solvents and is dried.

The process according to the invention is now continued by subjecting the magnetic recording medium, which has been surface-treated in the basic medium, to a heat treatment. Depending on the thickness of the protective layer which forms the wear-resistant surface, and on the thermal properties of the base material, the heat treatment is carried out at from 170° C. to 300° C., preferably at from 170° C. to 280° C. The duration of the heat treatment depends on the thickness of the protective layer and the temperature, and is from 5 minutes to 15 hours, usually from 10 minutes to about 8 hours. The temperature and duration are advantageously chosen so that the thickness of the protective layer is from 0.01 $\mu$m to 0.2 $\mu$m, preferably from 0.01 $\mu$m to 0.1 $\mu$m. The heat treatment is advantageously carried out in air. However, it is obvious that the same results are achievable by employing a similar procedure with other oxygen-containing gases.

Suitable heat-resistant bases for the magnetic recording media are all conventional bases for thin layers of magnetic metal which are substantially dimensionally stable at up to 300° C. Disks of aluminum or aluminum alloys, of conventional thickness, are preferred; they may also be pretreated, e.g. provided with a chemically or electrolytically deposited layer of copper. Bases consisting of other metals and of plastics, e.g. copper foils, polyimide films or polyethylene terephthalate films, may also be used. In these cases, adhesion-promoting layers are, in most cases, used between the base and the magnetic layer.

Suitable thin layers of ferromagnetic metal are the conventional layers, of thickness from about 600 to 6,000 Å, which can be deposited by conventional methods, using chemical deposition, electrolytic deposition or vapor deposition, i.e. deposition of the metals or metal alloys from the gas phase, in a high vacuum, onto a base which may or may not have been pre-treated. Chemical and electrolytic deposition are preferred.

Suitable thin layers of cobalt-containing ferromagnetic metal consist, above all, of cobalt/phosphorus and cobalt/boron alloys, as well as cobalt/nickel, cobalt-/nickel/iron and cobalt/iron alloys and phosphorus-containing, boron-containing and/or nitrogen-containing alloys of the above type, e.g. alloys of from about 95 to 98% of cobalt and from 2 to 10% of phosphorus, of from about 30 to 20% of nickel and from 70 to 80% of cobalt, of about 90% of cobalt, 9% of nickel and 1% of phosphorus, of about 88% of cobalt, 9% of nickel and 3% of boron or of from about 40 to 50% of cobalt, from 40 to 50% of nickel and from 1 to 5% of boron. Using the alloys it is. for example. possible to produce films of less than 0.6 $\mu$m thickness by chemical deposition on preferably polished substrates, the films having, for example, a coercive force of from 300 to 900 Oe and a magnetization 4 $\pi I_s$ of from 10,000 15,000 Gauss.

A ferromagnetic metal layer particularly preferred for the purposes of the invention comprises from 90 to 98.5% of cobalt and from 1.5 to 10% of phosphorus, is from 0.08 to 0.5 $\mu$m thick and is applied by electrolytic deposition or electroless deposition on a base consisting of a copper-plated aluminum alloy.

It is found, surprisingly, that the process according to the invention gives an exceptionally uniform oxide layer on the surface of the ferromagnetic film. The uniform reactivity of the entire surface manifests itself visually in uniform coloration of the oxidized surface layers, which may, for example, have a yellowish or blue appearance. In addition to exceptionally good adhesion between the magnetic layer and the protective layer applied thereto, excellent wear resistance of the surfaces is achieved.

The invention is explained in more detail in the Examples which follow. To determine the wear resistance, the disks are mounted on a rotating plate. The stress responsible for the wear is produced by a spherically ground abrasive body produced from conventional magnetic head materials, which slide under suitable pressure conditions on the surface of the disk. A vibration pick-up is mounted on the abrasive body; the signal from the pick-up is suitably amplified and then recorded, on a laboratory pen recorder, as a function of time. If the surface of te disk is undamaged, the friction between the disk surface and the surface of the test body causes the latter body to execute vibrations which are transmitted by the pick-up. The amplitude of these vibrations is very sensitive to variations in frictional characteristics and rises sharply if the surface of the disk is damaged by wear. Hence, the time from the start of exposure to the wear stress up to the occurrence of the abrupt rise in the vibration amplitude is a measure of the life of the surface.

EXAMPLE 1

Copper foils coated on both sides with about 0.15 $\mu$m of a cobalt/phosphorus alloy were dipped in aqueous NaOH solutions, contained in a beaker, at 22° C. The experimental conditions and the results obtained after subsequent heat treatment are shown in Table 1.

TABLE 1

| Sample | pH | Duration of treatment | Coloration after 2 hours' heating at 240° C. in air |
|---|---|---|---|
| 1 | 13 | 5 minutes | uniform dark violet |
| 2 | 12 | 15 minutes | uniform violet |

TABLE 1-continued

| Sample | pH | Duration of treatment | Coloration after 2 hours' heating at 240° C. in air |
|---|---|---|---|
| 3 | 11 | about 20 minutes | uniform violet brown |
| 4 | 10 | 25–30 minutes | uniform golden brown |
| 5 | 9 | ≧ 45 minutes | uniform deep blue |
| 6 | 8 | | |

COMPARATIVE EXAMPLE

A sample as described in Example 1 is heated directly, i.e. without treatment in the alkaline medium, for 2 hours at 240° C. in air. After this treatment, the cobalt/phosphorus layers have a surface exhibiting several colors, indicating non-uniform oxidation.

EXAMPLE 2

Polished 12 inch aluminum disks, as used in data processing, were copper-plated and coated, by the conventional method, with a Co/P magnetic film which is about 0.4 μm thick. Aqueous NaOH was placed in a transparent open vessel; the pH of the solution at room temperature was about 12. The solution was heated to 40° C., which caused the pH to change to about 11.5. A Co/P-coated base (sample A) was dipped in the solution for 75 seconds. A second base (sample B) was dipped for 150 seconds. Sample A showed no visually detectable primary oxide film; sample B, in contrast, showed a pale yellow but very uniform coloration. Both samples were rinsed with water and methanol and then heated for 4 hours at 242° C. in air in a laboratory drying oven. After this treatment, sample A had a uniform golden brown surface whilst sample B showed a violet coloration.

The wear resistance of the recording media produced by this method was tested in comparison with a commercial magnetic memory disk coated with a $\gamma$-$Fe_2O_3$ dispersion.

The results are summarized in Table 2.

TABLE 2

| Sample | Wear resistance (minutes) |
|---|---|
| A (0.4 μm Co/P layer) | 8 |
| B (0.4 μm Co/P layer) | 13 |
| Commercial magnetic memory disk carrying a $\gamma$-$Fe_2O_3$ layer | 2–8 |

EXAMPLE 3

Copper foils carrying cobalt/phosphorus layers were treated in various aqueous basic solution at about 20° C., rinsed with water and alcohols and then heated in air. Table 3 shows the results. In all cases, uniformly oxidized surfaces were obtained.

TABLE 3

| Sample | Thickness of Co/P layer [μm] | pH of aqueous solution obtained by adding | Duration of treatment and appearance after the treatment in the alkaline solution | Heat treatment |
|---|---|---|---|---|
| 1 | 0.45 | $Na_2CO_3$; pH = 11.6 | 15 minutes, pale yellow | 90 minutes, 240° C. brownish violet |
| 2 | 0.17 | $NH_3$; pH = 12 | 5 minutes, golden | 90 minutes, 240° C., brownish violet |
| 3 | 0.15 | Glycine/NaOH buffer, pH = 13 | 5 minutes, golden yellow | 90 minutes, 240° C., violet |
| 4 | 0.40 | $NaHCO_3$/NaOH buffer, pH = 10.69 | 20 minutes, pale yellow | 240 minutes, 240° C. blue |
| 5 | 0.15 | $Na_2HPO_4$/NaOH buffer, | 25 minutes, no detectable coloration | 240 minutes, 240° C., blue |
| 6 | 0.16 | $Na_3PO_4$; pH = 12.26 | 30 minutes, light golden coloration | 150 minutes, 240° C., brownish violet |

TABLE 4

| Sample | Thickness of the Co/P layer, μm | pH obtained by adding | Solvent | Duration of treatment and appearance after treatment in the organic solution | Heat treatment, 90 minutes in air at 240° C. |
|---|---|---|---|---|---|
| 1 | 0.45 | $NH_3$ | isopropanol | 30 minutes, no detectable color change | Surface uniformly blue |
| 2 | 0.15 | NaOH, 10 g/l in $CH_3OH$ | methanol | 20 minutes, no detectable color change | Surface uniformly brownish violet |

EXAMPLE 5

A commercial polyimide film was coated, by conventional methods, with a magnetic Co/P film of about 0.1 μm thickness and dipped for 15 minutes in an aqueous sodium hydroxide solution of pH=12 in an open vessel at 25° C.; this turned the surface layer golden yellow. After rinsing with $H_2O$ and acetone, the layer was oxidized for 2 hours in air at 180° C. As a result, the layer assumed a uniform deep yellow color over the entire surface.

EXAMPLE 6 a copper foil is provided, by the conventional method, with a chemically deposited magnetic nickel/phosphorus layer and then dipped for 10 minutes in an aqueous ammonia solution at pH 12. After washing first with water, then with acetone and then allowing to dry, the treated magnetic layer is heated for 120 minutes in air at 240° C. After this treatment, the magnetic metal layer has a uniform deep yellow color over its entire surface.

We claim:

1. In a process for the manufacture of a magnetic recording medium, provided with a uniform wear-resistant protective surface layer of thickness of 0.01 μm to 0.2 μm, the medium comprising a base which is stable up to 300° C. and a thin layer of cobalt-containing ferromagnetic metal of thickness from 0.06 μm to 0.6 μm, firmly bonded thereto, said ferromagnetic metal layer consisting essentially of from 90 to 98.5% by weight of cobalt and from 1.5 to 10% by weight of phosphorus, wherein the improvement comprises: treating the surface of the metallic recording layer at a pH of from 9 to 13.2 for from 1 to 60 minutes at temperatures of from 5° to 70° C. with a basic medium consisting essentially of (a) a solution of a compound in a solvent of water, lower alcohols or mixtures thereof, said compound being selected from at least one member of the group consisting of hydroxides, carbonates and tertiary phosphates of alkali metals and ammonia, and (b) gaseous exygen present in said solution, washing and drying the so-treated recording medium, and heating said treated recording medium in the presence of oxygen at temperatures of from 170° to 300° C.

2. A process as set forth in claim 1 wherein said base is a disc of aluminum or aluminum alloy.

3. A process as set forth in claim 1, wherein the aqueous solution employed contains a hydroxide, carbonate or tertiary phosphate of an alkali metal and has a pH of from 9 to 13.2.

4. a process as set forth in claim 1, wherein the aqueous solution which has a pH of from 9 to 13.2 additionally contains citrates and/or tartrates.

* * * * *